July 10, 1956   F. KAISER   2,753,996
FLOW SEPARATORS
Filed Jan. 7, 1953   2 Sheets-Sheet 1
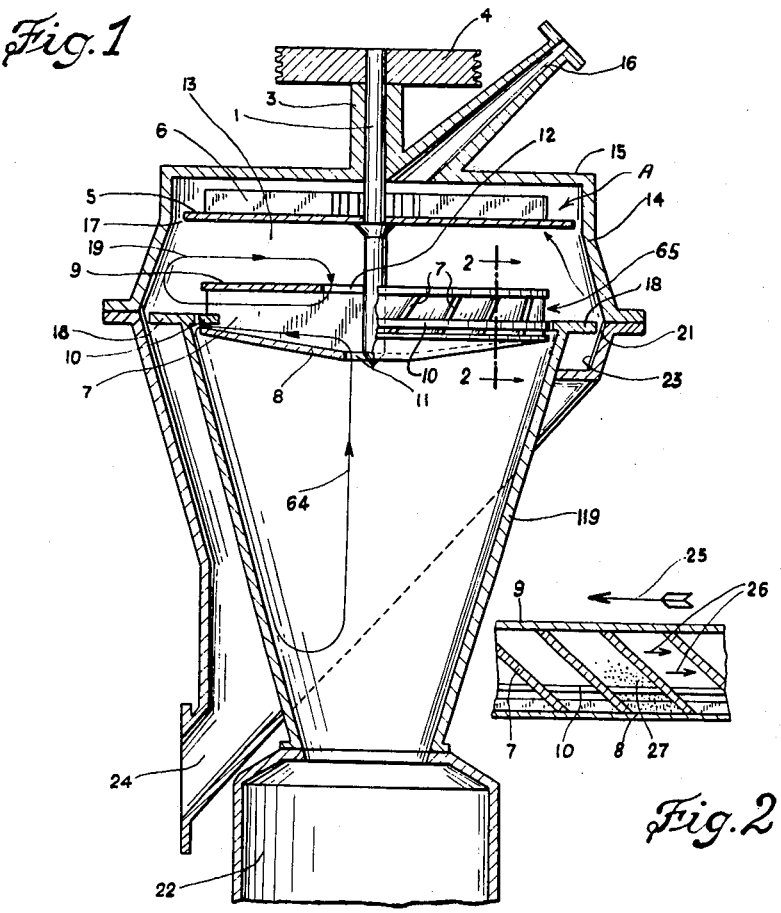
Fig.1
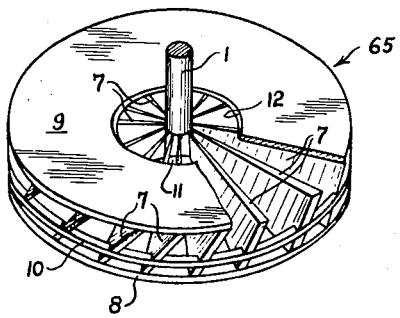
Fig.2
Fig.2a
INVENTOR
FRITZ KAISER
BY
ATTORNEYS July 10, 1956

F. KAISER 2,753,996

FLOW SEPARATORS

Filed Jan. 7, 1953

INVENTOR
FRITZ KAISER

BY

ATTORNEYS

United States Patent Office 2,753,996
Patented July 10, 1956

2,753,996

FLOW SEPARATORS

Fritz Kaiser, Augsburg, Germany, assignor to Alpine Aktiengesellschaft, Eisengiesserei und Maschinenfabrik, Augsburg, Germany Application January 7, 1953, Serial No. 330,020

Claims priority, application Germany January 17, 1952

5 Claims. (Cl. 209—139)

This invention relates to flow separators for classifying solid particles according to their size (falling velocity) and more particularly to that type of flow separators in which the current of separating fluid loaded with fine particles leaves a separation chamber near the axis of the latter, entering directly from there a radial-blade wheel of an impeller.

In known air flow separators, wherein the separating air with the fine particles suspended therein passes from the center of the separation chamber into an impeller, the mixture of particles and air is led from the impeller wheel through a long by-pass conduit into a collector, which surrounds the separation chamber and in which the fine material is deposited. From this collector the purified air re-enters, in some constructions after deflection by a screen or baffle formed of blades, the separation chamber in an inward direction. Some known separators have a second impeller wheel arranged a short distance ahead of the entrance of the purified air into the separation chamber.

It is one of the objects of this invention to provide a flow separator of simple and reliable construction having improved communication between the collector for the fine material and the impeller device.

A further object of the invention is to provide a flow separator of the kind above referred to which has small power requirements. In this respect, it is a further object of the invention to provide for a fluid circulation path of short length. Also with a view to power economy, it is a further object of the invention to provide a flow separator of the kind referred to wherein the fine particles have to pass only through a portion of the impeller.

Another object of the invention is to provide in a flow separator of the kind referred to a collector for the fine particles which is of optimum shape for the achievement of a high sharpness of separation also in those cases where the fine particles are relatively very small. In the previously mentioned known air flow separators the collector surrounds the separator proper as a housing of annular cross section through which extend supporting members for said separator proper. These supporting members interfere with the air flow through the collector and the settling out process within this collector becomes unsatisfactory if the size of the fine particles is below a certain limit.

To achieve these and other objects of the invention, I provide a flow separator of the kind referred to wherein the peripheral outlet end of the impeller wheel is divided in the axial direction into two sections so as to determine two branch currents. The branch current delivered by the outlet section nearer to the separation chamber is guided back into this chamber whereas the branch current delivered by the other outlet section is guided to the collector, from which it returns into the impeller wheel through a second connection between the collector and the interior of the impeller wheel.

In a preferred embodiment of the invention the blades of the impeller wheel are inclined with respect to a horizontal plane in the direction of rotation and at such an angle that by rotation of the impeller wheel, the solid fine particles are forced against the lower surfaces of the blades by utilizing the coriolis acceleration acting on the fine particles, and the separating fluid is enriched with solid fine particles in the lower area of the spaces between the blades, so that most of the solid fine particles are delivered from the lower part of the impeller wheel into the collector.

According to another embodiment of the invention the two outlet areas of the impeller wheel through which the above mentioned two branch currents are delivered may be connected with two inlet openings at the upper and lower center of the impeller wheel by means of two groups of fluid flow channels intersecting each other.

Preferably, the collector for the fine particles is in the form of a cyclone in which the fine particles are deposited under the action of the rotational energy which the branch current acquires while passing through the impeller wheel prior to entering the cyclone.

The path of that branch current which returns from the impeller wheel to the separation chamber may intersect the path the particles of larger size follow upon leaving the separation chamber. This branch current may pass back into the separation chamber over a path which is free of guide vanes or the like. While a vane ring may be used in some cases, such vane ring is not absolutely necessary.

Further objects and advantages of the invention will appear as the description proceeds, reference being had to the accompanying drawings, which illustrate by way of example two embodiments of the invention and in which:

Fig. 1 is a diametrical vertical sectional view of the first of said two embodiments, with the impeller wheel shown in full lines on the right side of the shaft;

Fig. 2 shows the development of a fragmentary vertical sectional view taken along the line 2—2 in Fig. 1;

Fig. 2a is a broken perspective view of the impeller wheel of the device shown in Fig. 1;

Figure 3:
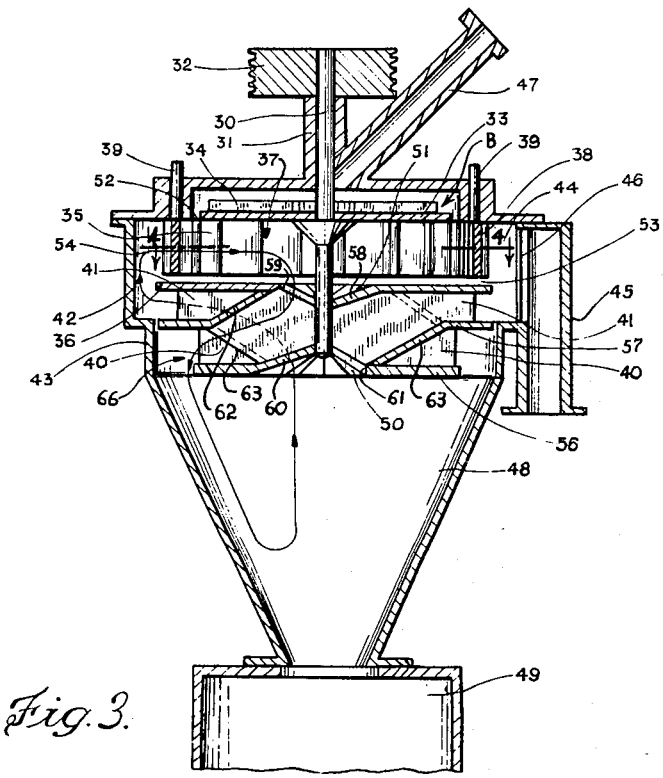
Fig. 3 is a diametrical vertical sectional view of the second of said two embodiments.

For the following description the separating fluid is assumed to be air, but any other gaseous or liquid vehicle may be used in the proper cases instead of air.

Referring first to Figs. 1, 2 and 2a a shaft 1 which is rotatably mounted in a bearing 3 and is operable by a suitable source of power, indicated by a drive pulley 4, carries a rotor generally denoted by the reference character A. This rotor comprises a feeder plate 5 carrying pre-acceleration blades 6 and a blower or impeller wheel 65 having substantially radially directed blades 7 mounted between a lower covering disc 8 and an upper ring or disc 9. An intermediate ring or disc 10 is secured to the blades 7 near their circumference, a small distance above the outer edge of the disc 8. The blades 7 are in inclined position relative to the lower covering disc 8 and the upper ring 9 as shown in Figs. 2 and 2a. The covering disc 8 has a central opening 11 and the ring 9 a central opening 12. Both openings 11 and 12 are of substantially larger diameter than the shaft 1. The feeder plate 5 and the ring 9 are spaced from each other so as to form between themselves a separation chamber 13 which is delimited laterally by a casing 14 into whose top 15 opens some supply means 16 for the material to be separated, such as a chute, a hopper or the like. The casing 14 surrounds the feeder disc 5, the separating chamber 13 and the impeller wheel 65. A small clearance 17 is provided between the feeder disc 5 and the side wall of the casing 14 for passing the separating fluid and the material to be separated. The outer edge of the intermediate ring 10 of the impeller wheel 65 is flush with a flange 18 at the top of a cyclone cone 119. There is only enough clearance left between the intermediate ring 10 and the inner edge of the flange 18 to permit the free rotation of the impeller wheel 65. A gap 21 between the outer edge of the flange 18 and the inner wall of the casing 14 establishes a communication between the separation chamber 13 and a space 23 serving as a depository for the coarse material as it becomes separated from the fine material. The space 23 can be emptied through an outlet 24. The cyclone 119 opens into a container 22.

The material to be separated is fed to the separator through the supply channel 16. The material leaving this channel falls upon the feeder plate 5 where it is placed into rotational movement by the blades 6. Due to centrifugal action the material flies outwardly and reaches the annular gap 17 through which it reaches the separation chamber 13. In this chamber an air current moving inwardly along spiral paths is created by the impeller blades 7. The projection of the path of this current onto the meridian plane is indicated in Fig. 1 by the curve 19. In this spiral current the air carries along with it, due to friction, particles below a certain size, that is below the so-called separation limit. The particles of a size above said separation limit are forced outwardly by centrifugal action. Thus, the coarse or over-size particles reach the inner surface of the side wall of the casing 14 and fall down there in counter current to the ascending branch of the separation current 19. The ascending air stream removes from the descending over-size material any fine particles that may still be clinging to that over-size material. Through the gaps or slots 21 the over-size material falls into the chamber 23, to be discharged from there through the outlet 24.

The fine material, which is carried along the path 19 towards the center of the device, leaves the separation chamber 13 through the central opening 12 in the disc 9, thus entering the blower wheel 65. In the impeller wheel 65, the current of separating fluid with the fine particles suspended therein is divided into upper and lower branch currents, the lower branch current of which carries the major portion of fine particles. This lower branch current travels along a path whose projection into the meridian plane is indicated by the curve 64 which shows that the lower branch current leaves the lower portion of the impeller wheel below the disc 10 and enters the periphery of the cyclone collector 119, from which separating fluid returns to the impeller opening 11. The way in which this takes place is illustrated in more detail in Fig. 2. As is well known, there acts on each body which moves radially in a rotating wheel and, therefore, also on the individual material particles here involved, a tangential force, called "coriolis force," whose direction is opposite to the direction of the rotation. In Fig. 2 the direction of the rotation is indicated by an arrow 25 and the direction of the coriolis force by arrows 26. The coriolis force causes a sliding down of the particles on the inclined blades 7 with the result that the particles accumulate in the lower portion of the blower wheel. For one of the cells formed between each two successive blades 7 of the blower wheel, i. e. the cell denoted as 27, Fig. 2 indicates this accumulation of fines near the bottom of the cell by dots. Due to this accumulation in the lower portion of the impeller the material leaves the latter predominantly below the intermediate ring 10 and moves then on in a by-pass current 64 which extends downwardly into the cone 119. In this cone the current 64 is freed from the fine particles which then accumulate in the container 22, whereas the cleaned air is sucked through the central opening 11 back into the blower or impeller wheel 65.

Figure 4:
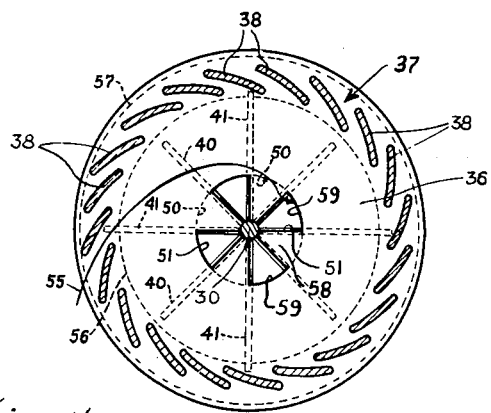
Fig. 4 is a horizontal sectional view of a portion of the device shown in Fig. 3 taken on the line 4—4 of Fig. 3.

Turning now to Figs. 3 and 4, it will be seen that the separator illustrated by those figures comprises a rotor, generally denoted as B, which is carried by a shaft 30 rotatably mounted in a bearing 31 and carrying a driving member 32, illustrated as a pulley but which may be any suitable power drive. Fixed to the shaft 30 is a revolving feeder plate 33 carrying pre-acceleration blades 34. Below the feeder plate 33 there is situated a separation chamber 35 which is limited at the bottom by a two-stage impeller wheel 66 fixed to the shaft 30 and sideways by a guide ring 37. This guide ring is composed of guide vanes 38 which are adjustably mounted on pins 39. A casing 42, which has a portion 43 of smaller diameter, surrounds the guide ring 37 and the two stages of the blower or impeller wheel 66 and forms an air conduit 44 communicating with a discharge pipe 45 for the coarse material. At the place where the air conduit 44 communicates with the discharge pipe 45 there is arranged a knife edge 46. A supply conduit 47, such as a hopper, a chute or the like, leads to the space above the pre-acceleration blades 34 at a point near the axis of that space. Below the portion 43 of the casing 42, 43 there is arranged a cone 48 for the collection of the fine particles from the air stream. This cone 48 empties into a container 49 for the fines. Between the disc 33 and the casing there is an annular gap 52 and between the lower ends of the guide vanes 38 and the impeller wheel 66 there is provided a clearance 53.

The two-stage impeller wheel 66 shown in Figs. 3 and 4 of the drawings comprises an upper disc 36 at the bottom of the separating chamber, the periphery of which is spaced from the casing 42 to leave a flow passageway, and a lower disc 56 at the top of the cyclone 48, the periphery of which is spaced from the casing portion 43 to leave a flow passageway. These discs are respectively attached to the upper and lower edges of alternating blades 40 and 41, respectively, for the two stages of the impeller wheel. These blades have the shapes shown in Fig. 3 and their inner ends are attached to the shaft 30. The peripheral portions of the blades 41 project radially to a greater extent than the peripheral portions of the blades 40. An intermediate disc 57 corresponding generally to the disc 10 of Fig. 1 is set in or between the peripheral portions of blades 40 and 41. The periphery of the disc 57 extends out to the casing portion 43 to leave a clearance which is only enough to permit the free rotation of the impeller wheel 66.

The inner portion of the disc 36 includes angularly-spaced portions 58, four of which are shown in Fig. 4, extending to the shaft 30 respectively along the upper edges of adjacent blades so as to cover the space between these blades. These portions 58, as shown in Fig. 4, alternate with openings 51 extending from the shaft 30 to edges 59. The inner portion of the disc 56 includes angularly-spaced portions 60 extending to the shaft 30 and covering alternate spaces between blades in the same manner as the portions 58. The inwardly-extending portions 60 alternate with openings 50 extending from the shaft to edges 61 of disc 56. The openings 50 and inwardly-extending portions 60 of the disc 56 are offset angularly with respect to the corresponding openings and portions of the disc 36, so that each portion 58 overlies an opening 50 and each portion 60 is below an opening 51.

The intermediate disc 57 includes inwardly-extending web portions 62 and 63, extending alternately upwardly and downwardly between adjacent blades 40 and 41 to the edges 59 and 61 of the discs 36 and 56. Each of the inwardly-extending portions 62 and 63 closes off the space between a pair of adjacent blades, the arrangement being such that the separating medium flowing downwardly through the openings 51 and through the spaces connected therewith is delivered from the impeller wheel 66 between the discs 56 and 57 into the casing 43, while the separating fluid entering the impeller through the openings 50 flows through the other spaces between the impeller blades and is delivered from the impeller wheel between the discs 36 and 57 into the casing portion 42.

The material to be separated, which is fed to the pre-acceleration blades 34 on the feeder plate 33 through the supply conduit 47, is imparted a rotational movement by these blades. Due to centrifugal force, the material reaches the annular gap 52 through which it enters the separation chamber 35. There, the two-stage impeller wheel 66 creates a current which moves inwardly along spiral paths whose projection onto the meridian plane is indicated in Fig. 3 by the curve 54. In Fig. 4 the path of the current is indicated by the stream line 55. In this spiral current, particles below a certain size, the separation limit, are carried inwardly by the carrying force of the air, whereas particles whose size surpasses the separation limit are thrown outwardly by the effect of centrifugal force. The separation limit can be adjusted according to requirements by changing the slope of the current spirals 55 through adjustment of the angle of the vanes 38.

The over-size material accumulates at the inner side of the guide ring 37 and there moves downwardly along a helical path. During this downward movement of the over-size particles the oppositely directed branch of the air current 54 removes any fine material that might have been carried along by some of the coarse particles. The latter leave the separation chamber 35 through the annular gap 53. The rotational component of the air stream leaving the upper part of the impeller wheel 66 and circulated in the casing 42 carries the coarse material in a circular path to the knife edge 46 at which point this material passes into the discharge pipe 45.

The fine material is carried inwardly by the separation current and leaves the separation chamber 35 through the central openings 51 to the first impeller stage of the impeller wheel 66. The first impeller stage blows the air laden with fine particles with a tangential component through the casing section 43 into the cyclone 48 where a large portion of said particles settles down. The air, now free to a large extent from particles, is sucked in by the second impeller stage through the openings 50 and delivered into the circumferential portion of the casing 42. From here it is returned between the guide vanes 38. The fine material depositing in the cone 48 is collected in the container 49.

While I have shown and described in the foregoing two particular constructional embodiments of the invention, I desire it to be understood that these embodiments have been given by way of example only, since various modifications and rearrangements of the details shown can be made without departing from the spirit of the invention or the scope of the appended claims. In particular, it will be obvious to those skilled in the art that, while I have shown separators with a flat cylindrical separating chamber through which separating fluid flows in inward direction along a spirally shaped path, the invention will offer advantages also in its application to other types of flow separators.

I claim:

1. In a flow separator for classifying a mixture of coarse and fine solid particles by means of a circulated separating fluid, a casing, a substantially cylindrical separating chamber located in the casing and having a substantially vertical axis, a rotatable shaft extending axially through the separating chamber, a disc fixed to the shaft at the upper end of the separating chamber the periphery of which is spaced with respect to the casing to provide an annular inlet opening for the solid particles to be classified, means for feeding the solid particles to be classified into said annular inlet opening, an impeller wheel for circulating the separating fluid and for producing a spiral-shaped flow in the separating chamber, said impeller wheel being located below said chamber and including radially-extending impeller blades fixed to said shaft and upper and lower discs attached respectively to the upper and lower edges of the impeller blades, said upper disc being located at the bottom of the separating chamber in spaced relation to the casing and provided with a substantially central opening adjacent the shaft for the flow of separating fluid and separated fine particles from the central portion of the separating chamber into the impeller wheel, a cyclone collector located axially below the impeller wheel, said lower disc of the impeller wheel being located at the upper end portion of the cyclone collector and provided with a substantially central opening for the flow of separating fluid from the cyclone collector into the impeller wheel, said impeller wheel including a current dividing means extending to the periphery of the impeller wheel in spaced relation axially with respect to the upper and lower discs of the impeller wheel for dividing the separating fluid induced into the impeller wheel into upper and lower currents, means cooperating with the periphery of the current dividing means for respectively directing the said upper and lower currents into the peripheral portions of the separating chamber and cyclone collector, and means providing an outlet from the casing for coarse particles separated out in the separating chamber by the spiral-shaped flow of separating fluid in the separating chamber.

2. A flow separator as claimed in claim 1, in which the blades of the impeller are inclined from the lower to the upper disc of the impeller in the direction of rotation of the impeller wheel at an angle such that the solid particles being carried through the impeller wheel by the separating fluid are forced against the inclined under surfaces of the blades and downwardly toward the lower disc, whereby the separating fluid in the lower portion of the impeller wheel is enriched with solid particles for delivery from the impeller wheel in the lower current.

3. A flow separator as claimed in claim 1, in which the current dividing means comprises an annular disc.

4. A flow separator as claimed in claim 1, in which the impeller wheel includes means for directing separating fluid from the separating chamber and cyclone collector respectively into alternate spaces between the blades of the impeller wheel, and means associated with the blades and the current dividing means of the impeller wheel for causing the separating fluid from the separating chamber and cyclone collector in the said alternate spaces to flow therein respectively under and over the current dividing means, whereby the streams of separating fluid flowing through the impeller wheel from the separating chamber and cyclone collector cross each other and are delivered respectively into the peripheral portions of the cyclone collector and the separating chamber.

5. A flow separator as claimed in claim 1, in which the inner portion of said upper and lower discs of the impeller wheel include angularly-spaced portions extending to the shaft along the blades of the impeller wheel covering alternate spaces between said blades, each of said discs between its angularly-spaced portions having edges spaced from the shaft to provide openings respectively to the other spaces between the blades, and in which said current-dividing means comprises a disc having an annular peripheral portion and portions extending inwardly from the annular peripheral portion generally toward the shaft between the blades, alternate ones of said inwardly-extending portions extending respectively upwardly and downwardly to the said edges respectively of the upper and lower discs of the impeller wheel, whereby separating fluid induced into the impeller wheel from the separating chamber and cyclone collector respectively enters the impeller wheel through the openings provided in the upper and lower discs to provide alternate streams in the impeller wheel respectively from the separating chamber and cyclone collector which cross each other in the impeller wheel so that the streams of separating fluid from the separating chamber are delivered through the periphery of the impeller wheel below said current-dividing disc while the streams of separating fluid in the impeller wheel from the cyclone collector are delivered through the periphery of the impeller wheel above said current-dividing disc.

References Cited in the file of this patent

UNITED STATES PATENTS 2,304,264     Lykken _____ Dec. 8, 1942

FOREIGN PATENTS 272,237     Switzerland _____ Mar. 1, 1951